United States Patent
Oda et al.

(10) Patent No.: US 10,323,844 B2
(45) Date of Patent: Jun. 18, 2019

(54) EXHAUST DUCT AND BOILER

(71) Applicant: MITSUBISHI HITACHI POWER SYSTEMS, LTD., Kanagawa (JP)

(72) Inventors: Manabu Oda, Tokyo (JP); Kiyonori Kushioka, Tokyo (JP); Shimpei Todaka, Tokyo (JP); Masashi Kiyosawa, Kanagawa (JP); Hideo Miyanishi, Kanagawa (JP); Hiroshi Kako, Kanagawa (JP)

(73) Assignee: Mitsubishi Hitachi Power Systems, Ltd., Kanagawa (JP)

( * ) Notice: Subject to any disclaimer, the term of this patent is extended or adjusted under 35 U.S.C. 154(b) by 130 days.

(21) Appl. No.: 15/533,184

(22) PCT Filed: Sep. 15, 2015

(86) PCT No.: PCT/JP2015/076192
§ 371 (c)(1),
(2) Date: Jun. 5, 2017

(87) PCT Pub. No.: WO2016/092930
PCT Pub. Date: Jun. 16, 2016

(65) Prior Publication Data
US 2017/0328564 A1 Nov. 16, 2017

(30) Foreign Application Priority Data
Dec. 12, 2014 (JP) .................................. 2014-252234

(51) Int. Cl.
*F23J 3/04* (2006.01)
*B01D 45/04* (2006.01)
(Continued)

(52) U.S. Cl.
CPC ............... *F23J 3/04* (2013.01); *B01D 45/04* (2013.01); *F23J 15/022* (2013.01); *F23M 5/00* (2013.01);
(Continued)

(58) Field of Classification Search
CPC combination set(s) only.
See application file for complete search history.

(56) References Cited

U.S. PATENT DOCUMENTS 2,244,936 A * 6/1941 Bird .................... F23J 15/022
126/280
2,677,437 A * 5/1954 Wagner ................. B01D 45/02
110/165 A
(Continued)

FOREIGN PATENT DOCUMENTS

CN 1776299 5/2006
CN 101104125 1/2008
(Continued)

OTHER PUBLICATIONS

First Office Action dated Jul. 4, 2018 in Chinese Patent Application No. 201580066834.5, with English Translation.
(Continued)

*Primary Examiner* — Nathaniel Herzfeld
(74) *Attorney, Agent, or Firm* — Wenderoth, Lind & Ponack, L.L.P.

(57) ABSTRACT

In an exhaust duct and a boiler, there are provided: a flue gas duct through which flue gases pass; a first hopper provided to the flue gas duct, the first hopper collecting PA in the flue gases; a low-repulsion section provided to the upstream side or the downstream side of the first hopper in the direction of flow of the flue gases, the low-repulsion section having a lower coefficient of repulsion than the inner wall surface of the flue gas duct; and a popcorn-ash-trapping section for
(Continued)

trapping PA in the flue gases, the popcorn-ash-trapping section provided to the downstream side of the first hopper and the low-repulsion section in the direction of flow of the flue gases, whereby it is possible for solid particles in the flue gases to be properly trapped.

11 Claims, 8 Drawing Sheets

(51) Int. Cl.
    *F23J 15/02* (2006.01)
    *F23M 5/00* (2006.01)
    *B01D 45/08* (2006.01)

(52) U.S. Cl.
    CPC .......... *B01D 45/08* (2013.01); *F23J 2217/20* (2013.01); *F23J 2217/30* (2013.01)

(56) References Cited

U.S. PATENT DOCUMENTS

| | | | | |
|---|---|---|---|---|
| 2,949,099 | A * | 8/1960 | Miller | F22B 21/345 110/165 A |
| 4,202,280 | A * | 5/1980 | Bereiter | F23J 15/027 110/216 |
| 5,687,657 | A * | 11/1997 | Ziegler | B01D 45/06 110/203 |
| 5,738,711 | A * | 4/1998 | Finnemore | B01D 45/06 55/321 |
| 6,994,036 | B2 * | 2/2006 | Grommes | B01D 46/0053 110/165 A |
| 7,100,521 | B2 | 9/2006 | Ryan | |
| 2005/0150439 | A1 | 7/2005 | Ryan | |
| 2008/0028935 | A1 | 2/2008 | Andersson | |
| 2008/0041417 | A1 * | 2/2008 | Varner | F23J 15/006 134/6 |
| 2014/0083629 | A1 * | 3/2014 | Fukuda | C02F 1/048 159/4.02 |
| 2014/0090560 | A1 * | 4/2014 | Buzanowski | B01D 46/103 95/287 |
| 2016/0273766 | A1 * | 9/2016 | Oda | F23J 3/04 |

FOREIGN PATENT DOCUMENTS

| | | |
|---|---|---|
| CN | 101327406 | 12/2008 |
| DE | 117 274 | 1/1976 |
| EP | 3 034 943 | 6/2016 |
| JP | 49-126185 | 12/1974 |
| JP | 53-141942 | 12/1978 |
| JP | 57-117721 | 7/1982 |
| JP | 1-129548 | 9/1989 |
| JP | 2724176 | 3/1998 |
| JP | 10-165734 | 6/1998 |
| JP | 2008-126148 | 6/2008 |
| JP | 2013-103214 | 5/2013 |
| JP | 2013-155940 | 8/2013 |
| WO | 2013/073393 | 5/2013 |
| WO | 2015/098411 | 7/2015 |

OTHER PUBLICATIONS

International Search Report dated Dec. 22, 2015 in corresponding International (PCT) Application No. PCT/JP2015/076192, with English translation.
Written Opinion of the International Searching Authority dated Dec. 22, 2015 in corresponding (PCT) Application PCT/JP2015/076192, with English translation.
Extended European Search Report dated Oct. 12, 2017 in European Application No. 15866675.0.

* cited by examiner

EXHAUST DUCT AND BOILER

TECHNICAL FIELD

The present invention relates to an exhaust duct which is applied to a boiler which generates steam for power generation, a factory, or the like, and a boiler including the exhaust duct.

BACKGROUND ART

For example, in the related art, a pulverized coal fired boiler includes a furnace which has a hollow shape and is installed is a vertical direction, and a plurality of combustion burners are disposed on a wall of the furnace along a circumferential direction and are arranged in a plurality of stages in an upward-downward direction. A gaseous mixture of pulverized coal (fuel) which is crushed coal and transport air (primary air) is supplied to the combustion burner, high-temperature secondary air is supplied to the combustion burner, flames are generated by blowing the gaseous mixture and the secondary gas into the furnace, and combustion gas can be generated in the furnace. In addition, a flue gas duct is connected to the upper portion of the furnace, a superheater, a repeater, an economizer, or the like for collecting heat of a flue gas is provided in the flue gas duct, water is heated by an exhaust gas generated by combustion in the furnace, and steam can be generated. In addition, a flue gas duct is connected to the flue gas duct, a denitration device, as electric dust collector, a desulfurization device, or the like is provided in the flue gas duct, and a funnel is provided on a downstream end portion of the flue gas duct.

For example, as the boiler, there are boilers which are disclosed in U.S. Pat. No. 6,994,036 and Japanese Unexamined Patent Application Publication No. 2013-103214.

In the above-described pulverized coal fired boiler, since pulverized coal which is a fuel is combusted in a furnace, popcorn ashes (massive ashes) which solid particles may be mixed into the flue gas. Since the popcorn ashes are lumps of ashes, the popcorn ashes block a screen, a denitration device, or the like provided in a flue gas duct. Accordingly, the screen is abraded and needs to be exchanged, and a maintenance cost increases. In addition, the popcorn ashes are accumulated on the screen or the denitration device, pressure loss increases, and performance decreases. Moreover, in the flue gas treatment device of Japanese Unexamined Patent Application Publication No. 2013-103214, a popcorn-ash-trapping section is provided on the downstream side of a hopper. However, there is a concern that the popcorn-ash-trapping section may be damaged by collision of the popcorn ashes due to a long-term use.

The present invention is made to solve the above-described problems, and an object thereof is to provide an exhaust duct and a boiler in which solid particles in a flue gas can be appropriately trapped.

SUMMARY OF THE INVENTION

In order to achieve the object, according to an aspect of the present invention, there is provided an exhaust duct, including: a flue gas duct through which a flue gas flows; a hopper which is provided in the flue gas duct and collects solid particles in the flue gas; a low-repulsion section which is provided on an upstream side or a downstream side of the hopper in a direction of flow of the flue gas and has a lower coefficient of repulsion than that of an inner wall surface of the flue gas duct; and a solid particle trapping section which is provided on downstream sides of the hopper and the low-repulsion section in the direction of flow of the flue gas and traps solid particles in the flue gas.

Accordingly, when the flue gas flows through the flue gas duct, the solid particles are separated from the flue gas and collected the hopper. In this case, since the solid particles have an inertial force, the solid particles collide with the inner wall surface of the flue gas duct, are not collected in the hopper, and easily flow to the downstream side. However, since the solid particles collide with the low-repulsion section, repulsion amounts of the solid particles decrease and the solid particles are appropriately collected in the hopper. In addition, the solid particles which are not collected in the hopper and flow to the downstream side are trapped by the solid particle trapping section. As a result, it is possible to appropriately trap the solid particles in the flue gas in the hopper and it is possible to improve trapping efficiency.

In the exhaust duct of the present invention, the flue gas duct includes a first vertical section through which the flue gas flows downward in a vertical direction and a horizontal section which is connected to the first vertical section. The hopper is provided below a connection section between the first vertical section and the horizontal section, and the low-repulsion section is provided on the lower wall surface section in the first vertical section on the upstream side of the hopper in the direction of flow of the flue gas.

Accordingly, if the low-repulsion section is provided on the upstream side of the hopper, the solid particles included in the flue gas collide with the low-repulsion section before the hopper, the inertial force of the solid particles decreases, and the solid particles easily enter the hopper. Accordingly, it is possible to decrease the amount of the solid particles which jump over the hopper and are scattered toward the downstream side to flow out.

In the exhaust duct of the present invention, the low-repulsion section includes an inclination surface which is inclined in the same direction as that of an inclination surface of the hopper.

Accordingly, since the inclination surface of the low-repulsion section and the inclination surface of the hopper are inclined in the same direction, if the solid particles included in the flue gas collide with the low-repulsion section, the solid particles fall along the inclination surface of the hopper from the inclination surface of the low-repulsion section so as to be collected in the hopper, and it is possible to appropriately introduce the solid particles to the hopper.

In the exhaust duct of the present invention, the inclination surface of the low-repulsion section extends to the inclination surface of the hopper.

Accordingly, since the low-repulsion section extends to the hopper, the inertial force of the solid particles is appropriately decreased by the low-repulsion section so as to easily enter the hopper, and it is possible to prevent the solid particles from being scattered from the hopper again.

In the exhaust duct of the present invention, the lower wall surface section of the first vertical section includes an inclination surface and a horizontal surface arranged in the direction of flow of the flue gas, and the low-repulsion section is provided from the inclination surface to the horizontal surface.

Accordingly, since the low-repulsion section is provided from the inclination surface to the horizontal surface, the low-repulsion section is formed to extend in the direction of flow of the flue gas and the horizontal surface by which the inertial force of the solid particles can be decreased is formed. Therefore, the solid particles easily enter the hopper and it is possible to prevent the solid particles from being scattered from the hopper again.

In the exhaust duct of the present invention, the solid particle trapping section is provided the vertical direction.

Accordingly, since the solid particles which are not collected in the hopper and flow to the downstream side collide with the solid particle trapping section, it is possible to appropriately trap the solid particles.

In the exhaust duct of the present invention, the solid particle trapping section is provided so as to be inclined such that the upper portion is positioned on the upstream side in the direction of flow of the flue gas.

Accordingly, since the solid particle trapping section is provided so as to be inclined on the upstream side, the solid particle trapping section causes the solid particles which are not collected in the hopper and flow to the downstream side to effectively fall into the hopper to trap the solid particles.

In the exhaust duct of the present invention, the solid particle trapping section is provided in a region of 30% to 50% of the entire height of the flue gas duct from the lower wall surface section in the horizontal section.

Accordingly, since the solid particle trapping section is provided in only the region to which the solid particles which are not collected in the hopper easily flow out, it is possible to reduce the size and the cost of the solid particle trapping section.

In the exhaust duct of the present invention, the solid particle trapping section is provided in a region of 100% of the entire height of the flue gas duct.

Accordingly, since the solid particle trapping section is provided on the entire region of the exhaust duct, it is possible to more reliably trap the solid particles, which are not collected in the hopper and flow to the downstream side, by the solid particle trapping section.

In the exhaust duct of the present invention, the flue gas duct, includes a horizontal section through which the flue gas flows in a horizontal direction and a second vertical section which is connected to the horizontal section and through which the flue gas flows upward in a vertical direction, the hopper is provided below connection section between the horizontal section and the second vertical section, and the low-repulsion section is provided on a standing wall surface section in the second vertical section facing the horizontal section on the downstream side of the hopper in the direction of flow of the flue gas.

Accordingly, if the low-repulsion section is provided on the downstream side of the hopper, since the solid particles included in the flue gas passes through the upper portion of the hopper and thereafter, collide with the low-repulsion section, the inertial force of the solid particles decreases and the solid particles easily enter the hopper. Therefore, it is possible to decrease the amounts of the solid particles which jump over the hopper and are scattered toward the downstream side so as to flow out.

In the exhaust duct of the present invention, the solid particle trapping section is provided in the horizontal direction.

Accordingly, since the solid particles which are not collected in the hopper and flow to the downstream side collide with the solid particle trapping section, it is possible to appropriately trap the solid particles.

In the exhaust duct of the present invention, the solid particle trapping section is provided in a region of 30% to 50% of a horizontal length of the second vertical section from the standing wall surface section in the second vertical section facing the horizontal section.

Accordingly, since the solid particle trapping section is provided in only the region to which the solid particles which are not collected in the hopper easily flow out, it is possible to reduce the size and the cost of the solid particle trapping section.

In addition, according to another aspect of the present invention, there is provided a boiler including: a furnace which has a hollow shape and is installed in a vertical direction; combustion equipment which blows a fuel toward the inner portion of the furnace and combusts the fuel; the exhaust duct which is connected to a downstream side in a direction of flow of a flue gas the furnace; and a heat collection section which is provided in the exhaust duct and can collect heat in the flue gas.

Accordingly, flames are generated by blowing the fuel into the furnace using the combustion equipment, the generated combustion gas flows into the exhaust duct, and the solid particles are separated from the flue gas and collected in the hopper while the heat collection section collects the heat of the flue gas. In this case, in the flue gas which flows through the flue gas duct, since the solid particles are separated from the flue gas and collide with the low-repulsion section, the repulsion amounts of the solid particles decrease, and the solid particles are appropriately collected in the hopper. Accordingly, the solid particles which are not collected in the hopper and flow to the downstream side are trapped by the solid particle trapping section. As a result, it is possible to appropriately trap the solid particles of the flue gas in the hopper, and it is possible to improve trapping efficiency.

Advantageous Effects of Invention

According to the exhaust duct and the boiler of the present invention, since the low-repulsion section having a lower coefficent of repulsion than that of an inner wall surface of the flue gas duct is provided on the upstream side or the downstream side of the hopper and the solid particle trapping section is provided on the downstream sides of the hopper and the low-repulsion section, it is possible to appropriately trap the solid particles of the flue gas in the hopper and it is possible to improve trapping efficiency.

DESCRIPTION OF EMBODIMENTS

Hereinafter, preferred embodiments of an exhaust duct and a boiler of the present invention will be described in detail with reference to the accompanying drawings. In addition, the present invention is not limited by the embodiments, and in a case where there are the plurality of embodiments, the present invention also includes combination of the embodiments.

First Embodiment

Figure 6:
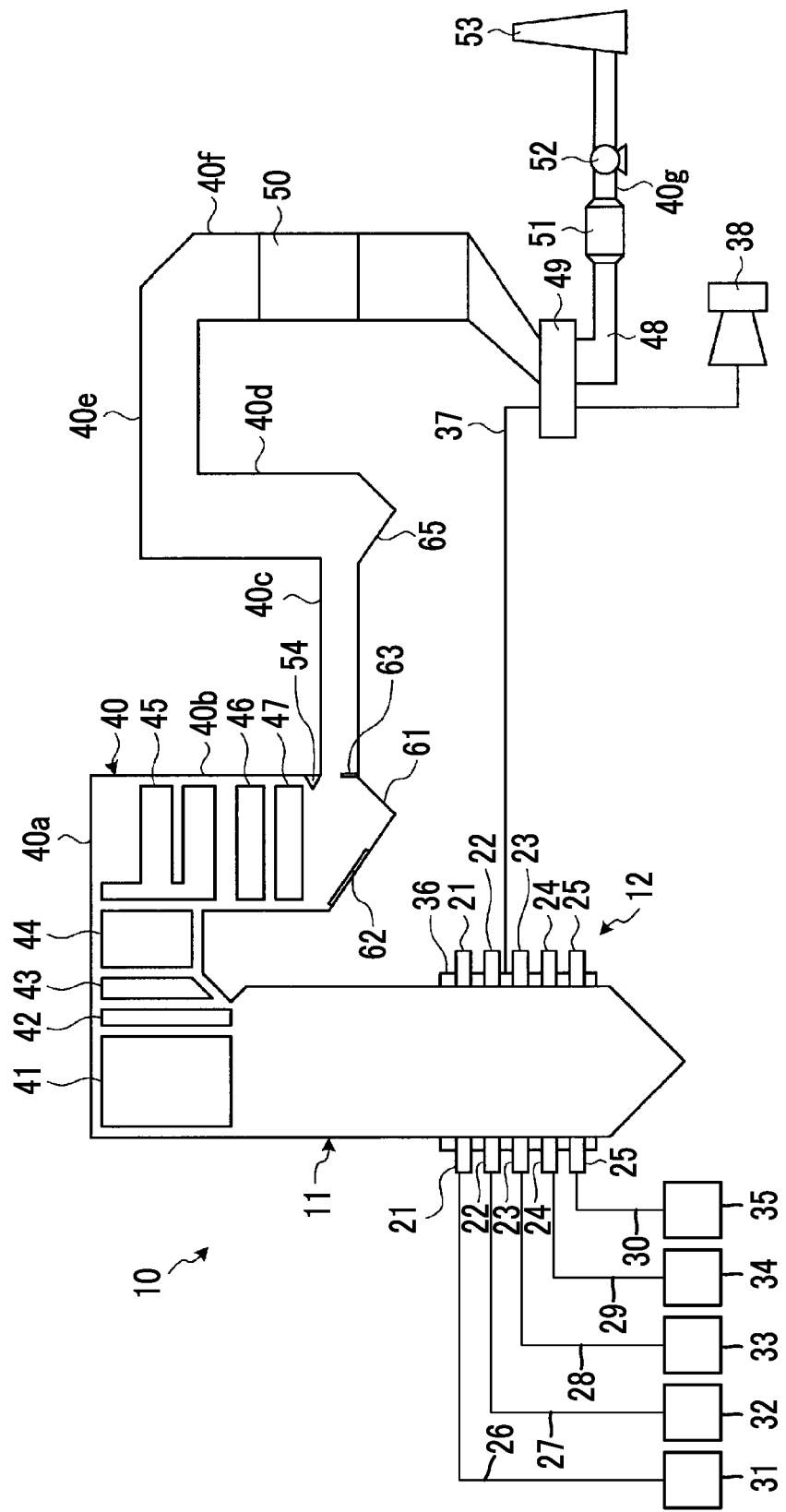
FIG. 6 is a schematic configuration view showing a pulverized coal fired boiler to which the exhaust duct of the first embodiment is applied.

FIG. 6 is a schematic configuration view showing a pulverized coal fired boiler to which an exhaust duct of a first embodiment is applied.

The pulverized coal fired boiler to which the exhaust duct of the first embodiment is applied is a boiler in which pulverized coal which is crushed coal is used as a solid fuel, the pulverized coal is combusted by a combustion burner, and heat generated by the combustion can be collected. In addition, here, the case where the pulverized coal fired boiler applied is described. However, is the present invention, the boiler is not limited to the pulverized coal fired boiler, and the fuel is not limited to the coal.

In the first embodiment, as shown in FIG. 6, a pulverized coal fired boiler 10 is a conventional boiler, and includes a furnace 11 and combustion equipment 12. The furnace 11 has a square cylindrical hollow shape and is installed along a vertical direction, and the combustion equipment 12 is provided on a lower portion of a furnace wall configuring the furnace 11.

The combustion equipment 12 includes a plurality combustion burners 21, 22, 23, 24, and 25 which are mounted on the furnace wall. In the present embodiment, in the combustion burners 21, 22, 23, 24, and 25, four burners which are arranged with equal intervals therebetween in a circumferential direction are set to one set, and five sets of burners, that is, five stages of burners are disposed in the vertical direction.

In addition, each of the combustion burners 21, 22, 23, 24, and 25 is connected to each of coal pulverizers (mills) 31, 32, 33, 34, and 35 via each of pulverized coal supply pipes 26, 27, 28, 29, and 30. In each of the coal pulverizers 31, 32, 33, 34, and 35, although it is not shown, a crushing table is supported so as to be driven and rotated around a rotational axis along a vertical direction in a housing, and a plurality or crushing rollers facing the upper portion of the crushing table are rotatably supported so as to interlock with the rotation of the crushing table. Accordingly, if coal is input to a portion between the plurality of crushing rollers and the crushing table, here, the coal is crushed so as to be a predetermined size, and it possible to supply pulverized coal classified by a transport air (primary air) from the pulverized coal supply pipes 26, 27, 28, 29, and 30 to the combustion burners 21, 22, 23, 24, and 25.

Moreover, in the furnace 11, a wind box 36 is provided on the mounting position of each of the combustion burners 21, 22, 23, 24, and 25, one end portion of an air duct 37 is connected to the wind box 36, and a blower 38 is mounted on the other end portion of the air duct 37. Accordingly, combustion air (secondary air and tertiary air) fed by the blower 38 is supplied from the air duct 37 to the wind box 36, and the combustion air can be supplied from the wind box 36 to each of the combustion burners 21, 22, 23, 24, and 25.

Therefore, in the combustion equipment 12, each of the combustion burners 21, 22, 23, 24, and 25 can blow a pulverized fuel-gas mixture (fuel gas), in which the pulverized coal and the primary air are mixed with each other, into the furnace 11, can blow the secondary air into the furnace 11, and can form flames by igniting the pulverized fuel-gas mixture using an ignition torch (not shown).

Moreover, in general, when the boiler starts, each of the combustion burners 21, 22, 23, 24, and 25 forms flames by injecting fuel oil into the furnace 11.

A flue gas duct 40 is connected to the upper portion of furnace 11, and superheaters 41 and 42 for collecting the heat of the flue gas, reheaters 43 and 44, and economizers 45, 46, and 47 which are convection heat transfer portions (heat collection sections) are provided in the flue gas duct 40, and heat exchange is performed between the flue gas generated by the combustion of the furnace 11 and water.

A flue gas pipe (flue gas duct) 48 through which the flue gas subjected to the heat exchange is discharged is connected to the downstream side of the flue gas duct 40. An air heater 49 is provided between the flue gas pipe 48 and the air duct 37, heat exchange between air flowing through the air duct 37 and the flue gas flowing through the flue gas pipe 48 is performed, and it is possible to increase temperature of the combustion air supplied to the combustion burners 21, 22, 23, 24, and 25.

In addition, in the flue gas pipe 48, a selective reduction type catalyst 50 is provided at the position on the upstream side of the air heater 49, an ash dust processing device (electric dust collector, desulfurization device) 51 and an induced blower 52 are provided at the position on the downstream side of the air heater 49, and a funnel 53 is provided on the downstream end portion of the flue gas pipe 48. Here, the selective reduction type catalyst 50 and the electric ash dust processing device 51 function as a harmful matter removing portion.

Accordingly, if the coal pulverizers 31, 32, 33, 34, and 35 are driven, the produced pulverized coal is supplied to the combustion burners 21, 22, 23, 24, and 25 through the pulverized coal supply pipes 26, 27, 28, 29, and 30 along with the transport air. In addition, the heated combustion air is supplied from the air duct 37 to each of the combustion burners 21, 22, 23, 24, and 25 via the wind box 36. Accordingly, the combustion burners 21, 22, 23, 24, and 25 blow the pulverized fuel-gas mixture, in which the pulverized coal and the transport air are mixed with each other, into the furnace 11 and blow the combustion air into the furnace 11, and at this time, it is possible to form flames by performing ignition. In the furnace 11, the pulverized fuel-gas mixture and the combustion air are combusted, flames are generated, and if flames are generated at the lower portion inside the furnace 11, the combustion gas (flue gas) rises in the furnace 11 and is discharged to the flue gas duct 40.

In addition, in the furnace 11, since supply amount of air is set so as to be less than a theoretical air amount with respect to a supply amount of the pulverized coal, a reduction atmosphere is maintained in the inner portion of the furnace 11. In addition, NOx generated by the combustion of the pulverized coal is reduced in the furnace 11, and thereafter, oxidation combustion of the pulverized coal is completed by additionally supplying additional air, and the generation amount of NOx is decreased by the combustion of the pulverized coal.

At this time, after water supplied from a water supply pump (not shown) is preheated by the economizers 45, 46, and 47, the water is supplied to a steam drum (not shown) and is heated so as to be saturated steam while being supplied to the water pipes (not shown) of the furnace wall, and the saturated steam is transported to a steam drum (not shown). Moreover, the saturated steam of the steam drum (not shown) is introduced into the superheaters 41 and 42 so as to be superheated by the combustion gas. The superheated steam generated by the superheaters 41 and 42 is supplied to a power generation plant (not shown) (for example, a turbine or the like). Moreover, the steam, which is extracted in the middle of an expansion process in the turbine, is introduced into the repeater 43 and 44, is superheated again, and is returned to the turbine. In addition, the drum (steam drum) type furnace 11 is described. However, the present invention is not limited to this structure.

Thereafter, harmful materials such as NOx of the flue gas passing through the economizers 45, 46, and 47 of the flue gas duct 40 are removed by the selective reduction type catalyst 50 in the flue gas pipe 48, particle materials and the sulfur contents are removed by the ash dust processing device 51, and thereafter, the flue gas is discharged from the funnel 53 to the atmosphere.

In the pulverized coal fired boiler 10 described as above, the flue gas duct 40 on the downstream side of the furnace 11 functions as the exhaust duct of the first embodiment. In addition, in the flue gas duct 40, a first horizontal flue gas duct section (first vertical section) 40a, a first vertical flue gas duct section 40b, a second horizontal flue gas duct section (horizontal section) 40c, a second vertical flue gas duct section (second vertical section) 40d, a third horizontal flue gas duct section 40e, a third vertical flue gas duct section 10f, and a fourth horizontal flue gas duct section 40g are continuously provided in addition, a kicker 54 is provided on the inner side of a connection section between the first vertical flue gas duct section 40b and the second horizontal flue gas duct section 40c in the horizontal direction.

In addition, in the flue gas duct 40, the superheaters 41 and 42, the reheaters 43 and 44, and the economizers 45, 46, and 47 are disposed in the first horizontal flue gas duct section 40a and the first vertical flue gas duct section 40b. In addition, in the flue gas duct 40, a first hopper 61 is installed on the lower end portion of the first vertical flue gas duct section 40b through which the flue gas having a downward velocity component flows, and a second hopper 65 installed on the lower end portion of the second vertical flue gas duct section 40d through which the flue gas having an upward velocity component flows. In addition, in the flue gas duct 40, the selective reduction type catalyst 50 is installed in the third vertical flue gas duct section 40f through which the flue gas flows downward.

Figure 1:
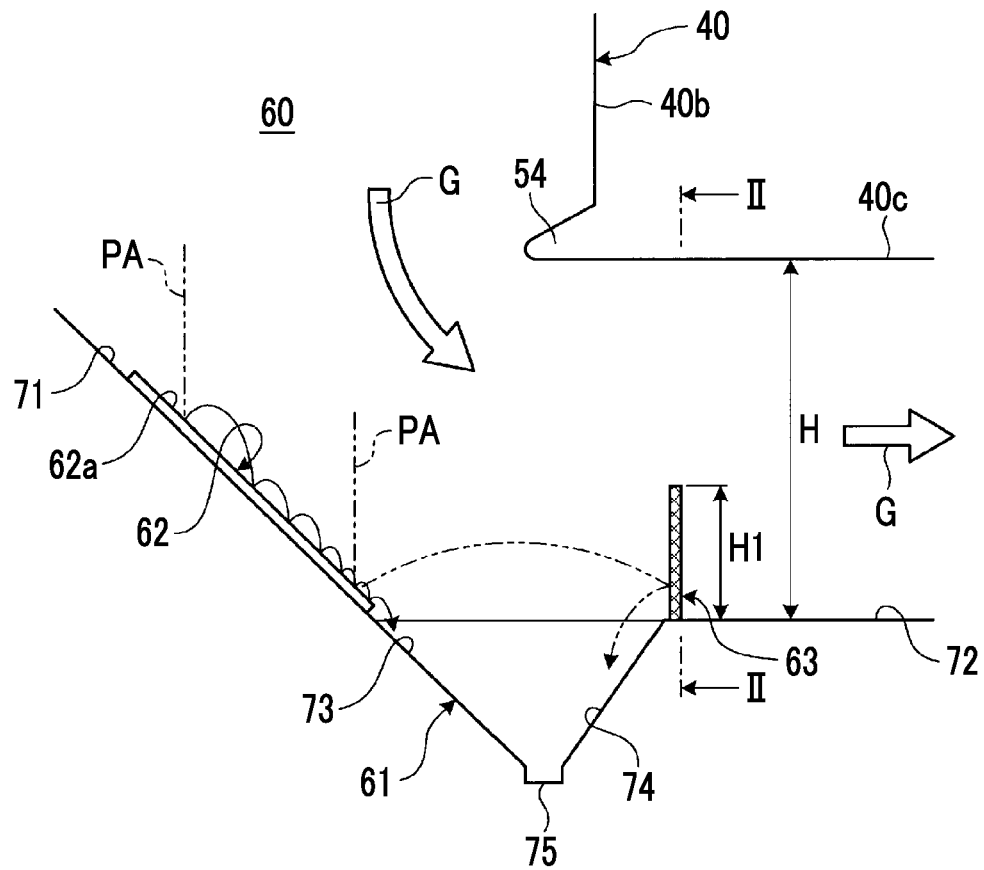
FIG. 1 is a side view showing an exhaust duct of a first embodiment.

Hereinafter, the exhaust duct of the first embodiment will be described in detail. FIG. 1 is a side view showing the exhaust duct of the first embodiment, and FIG. 2 is a sectional view taken along line II-II of FIG. 1 showing the exhaust duct.

Figure 2:
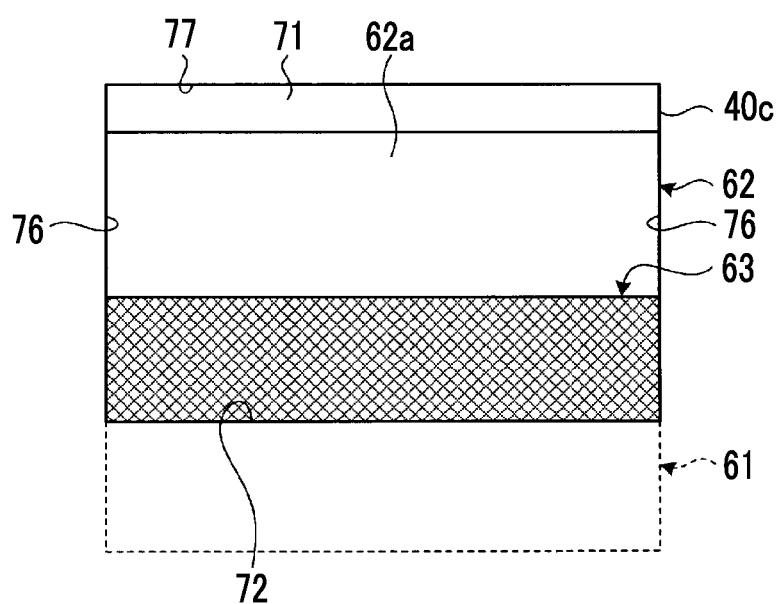
FIG. 2 is a sectional view taken along line of FIG. 1 showing the exhaust duct.

As shown in FIGS. 1 and 2, the exhaust duct of the first embodiment includes a flue gas duct 60 through which a flue gas flows, the first hopper 61 which is provided in the flue gas duct 60 and in which solid particles in the flue gas are collected, a low-repulsion section 62 which is provided on the upstream side of the first hopper 61 in the direction of flow of the flue gas and has a lower coefficient of repulsion than that of the inner wall surface of the flue gas duct 60, and a popcorn-ash-trapping section (solid particle trapping section) 63 which is provided on the downstream sides of the first hopper 61 and the low-repulsion section 62 in the direction of flow of the flue gas and traps popcorn ashes (solid particles and hereinafter, referred to as PA) is the flue gas.

The flue gas duct 60 includes a first vertical flue gas duct section 40b through which the flue gas duct gas flows downward in the vertical direction and the second horizontal flue gas duct section 40c which is connected to the first vertical flue gas duct section 40b and through which the flue gas flows in the horizontal direction, and the first hopper 61 is provided below the connection section of the first vertical flue gas duct section 40b and the second horizontal flue gas duct section 40c. A lower wall surface section 71 is provided below the first vertical flue gas duct section 40b, and the lower wall surface section 71 is an inclination surface which is inclined downward at a predetermined angle toward the second horizontal flue gas duct section 40c side and the first hopper 61 side. A lower wall surface section 72 is provided below the second horizontal flue gas duct section 40c, and the lower wall surface section 72 is a horizontal surface positioned is the horizontal direction.

The first hopper 61 mainly collects and stores the PA which is ashes having large diameters as the solid particles included in the flue gas. The first hopper 61 includes a first inclination surface 73 and a second inclination surface 71 which face each other in the flow direction of the flue gas such that an area of the first hopper 61 decreases downward, and a storage section 75 is provided on a bottom position at which the lower end portions of the inclination surfaces 73 and 74 are connected to each other. In addition, in the first hopper 61, an opening portion which can be opened and closed by an on-off valve (not shown) is provided in the storage section 75, and the stored PA can be discharged downward by opening the opening portion.

Here, the lower wall surface section 71 of the first vertical flue gas duct section 40b and the first inclination surface 73 of the first hopper 61 are connected to each other so as to be surfaces which are continued at approximately the same inclination angle. The angles of the lower wall surface section 71 and the first inclination surface 73 are set so as to be equal to or more than a repose angle such that the PA is dropped. In addition, the second inclination surface of the first hopper 61 and the second horizontal flue gas duct section 40c are connected so as to be bent at a predetermined angle.

The low-repulsion section 62 is provided on the lower wall surface section 71 in the first vertical flue gas duct section 40b on the upstream side of the first hopper 61 in the direction of flow of the flue gas. Since the lower wall surface section 71 of the first vertical flue gas duct section 40b is an inclination surface, the surface of the low-repulsion section 62 becomes an inclination surface 62a and has approximately the same angle as that of the first inclination surface 73. The low-repulsion section 62 has a sheet shape having a predetermined area, is fixed to the lower wall surface section (inclination surface) 71 in the first vertical flue gas duct section 40b, and is configured of a member having a lower coefficient of repulsion than that of the lower wall surface section 71 (for example, steel plate) to effectively improve trapping efficiency of the PA in the first hopper 61. Accordingly, when the PA falls along the low-repulsion section 62, since the PA falls while coming into contact with the inclination surface 62a, the repulsion amount of the PA is decreased when the PA collides with the low-repulsion section 62.

As a result, since the PA which falls along with the downward flue gas G directly collides with the low-repulsion section 62, the PA is repulsed so as to be smaller than the repulsion amount of the PA when the PA directly collides with the lower wall surface section 71 which is a steel plate, a probability of the PA jumping over the first hopper 61 and being scattered toward the lower wall surface section 72 of the second horizontal flue gas duct section 40c is reduced, and the trapping efficiency of the PA in the first hopper 61 is improved.

Figure 3:
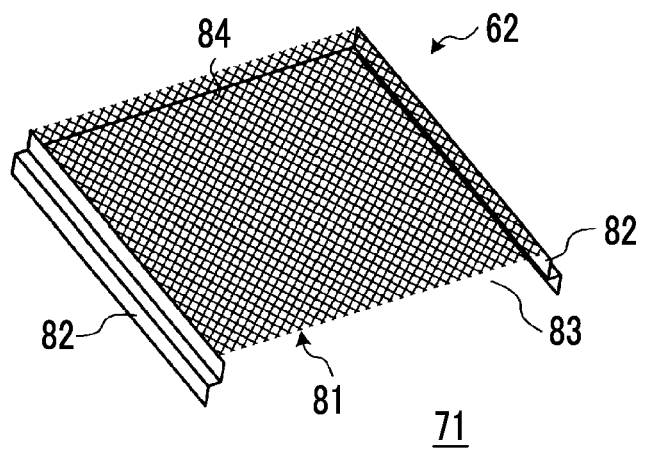
FIG. 3 is a perspective view showing a low-repulsion structure section which is provided in the exhaust duct.
Figure 4:
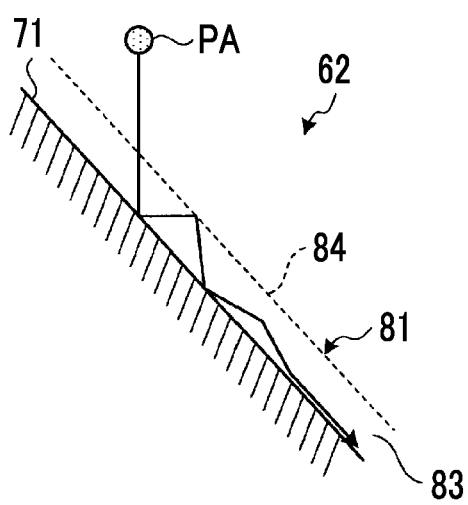
FIG. 4 is a schematic view showing effects of the low-repulsion structure section.
Figure 5:
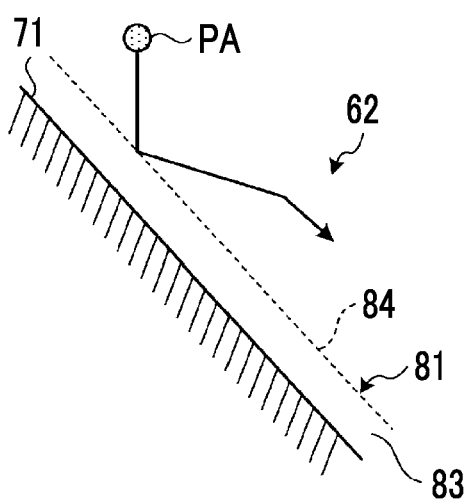
FIG. 5 is a schematic view showing effects of the low-repulsion structure section.

Hereinafter, a specific configuration example of the above-described low-repulsion section 62 will be described. FIG. 3 is a perspective view showing the low-repulsion structure section which is provided in the exhaust duct, and FIGS. 4 and 5 are schematic views showing effects of the low-repulsion structure section.

As shown in FIG. 3, the low-repulsion section 62 includes a wire netting (low-repulsion section formation member) 81 and a pair of frame bodies 82 which supports the wire netting 81 from both sides. Since the wire netting 81 is disposed so as to float by a predetermined height with respect to the lower wall surface section (inclination surface) 71 of a steel-plate duct by the pair of frame bodies 82, a space section 83 is formed between the lower wall surface section (inclination surface) 71 and the wire netting. In addition, a plurality of opening portions 84 serving as the passage of the PA are provided in the wire netting 81. Accordingly, as shown in FIG. 4, the PA which falls downward in the vertical direction passes through the opening portions 84 of the wire netting and collides with the lower wall surface section (inclination surface) 71 so as to be repulsed. However, thereafter, the PA is likely to collide with the back face side of the wire netting 81 again. As a result, the PA which collides with the back face side of the wire netting 81 falls into the space section 83 along the lower wall surface section (inclination surface) 71, and finally is collected in the first hopper 61.

Meanwhile, all PA which fall downward in the vertical direction does not pass through the opening portions 84 of the wire netting 81, and the PA may collide with the wire netting 81 in which linear members are combined in a lattice shape. As shown in FIG. 5, the PA which collides with the linear members of the wire netting 81 collides with a member which has a lower coefficient of repulsion than that of a general steel plate and is easily elastic-deformed, and as a result, the repulsion amount of the PA decreases, and the PA is likely to be collected in the first hopper 61. In this way, in the low-repulsion section 62, since the PA which passes through the opening portions 84 of the wire netting 81 and collides with the wire netting 81 can be effectively collected in the first hopper 61, it is possible to improve trapping efficiency of the PA in the first hopper 61.

In addition, the low-repulsion section 62 is wire netting 81. However the low-repulsion section 62 is not limited to this. As the low-repulsion section, in addition to the wire netting 81, for example, a lattice-shaped member such as a grating, a porous plate, or a bamboo blind structure (slatted shutter) may be used, which includes a plurality of opening portions having sizes in which the PA can pass through. Particularly, like the linear member of the wire netting 81, if the lattice-shaped low-repulsion member formed of a material which collides with the PA and is elastically deformed is adopted, collision energy of the PA due to elastic deformation is effectively absorbed, and it is possible to decrease the repulsion amount. In addition, due to rotation of the collided PA, the repulsion amount can be decreased. In addition, the low-repulsion section 62 is not limited to the porous member, and as the low-repulsion section 62, a heat insulation material, a rubber material, a plastic material, or the like which is not porous may be adopted.

In addition, as shown in FIGS. 1 and 2, the popcorn-ash-trapping section 63 traps the PA in the flue gas which cannot be collected by the first hopper 61. The popcorn-ash-trapping section 63 is formed of a wire netting having a mesh shape, and for example, configured of a plurality of openings in which one side is set to 2 mm to mm or less. In addition, the popcorn-ash-trapping section 63 is not limited to the wire netting having a mesh shape, and may be a screen or a porous body having vertical slits or horizontal slits.

The second horizontal flue gas duct section 40c has a rectangular cross section, and is configured such that side wall surface portions (vertical surfaces) 76 are formed on both sides of the lower wall surface section (horizontal surface) 72 and an upper wall surface portion (horizontal surface) 77 is formed on each side wall surface portion 76. The popcorn-ash-trapping section 63 is provided on the lower wall surface section (horizontal surface) 72 in the vertical direction. Moreover, the popcorn-ash-trapping section 63 is provided at a height H1 of a region from 30% to 50% of the entire height H from the lower wall surface section (horizontal surface) to the second horizontal flue gas duct section 40c. In this case, the popcorn-ash-trapping section 63 is provided on a region from 30% to 50% in a passage area of the flue gas duct 60. That is, the first vertical flue gas duct section 40b and the second horizontal flue gas duct section 40c are connected to each other so as to be bent 90°, the upstream end portion of the second horizontal flue gas duct section 40c, that is, the outer peripheral side of the region immediately after the first hopper 61 is blocked by the popcorn-ash-trapping section 63.

Here, effects of the exhaust duct of the first embodiment will be described.

As shown in FIG. 6, after heat of flue gas G is collected by the heat collection section (superheaters 41 and 42, reheaters 43 and 44, and economizers 45, 46, and 47) of the flue gas duct 40, the flue gas moves downward along the first vertical flue gas duct section 40b, is curved so as to be approximately perpendicular to the first vertical flue gas duct section 40b, and flows into the second horizontal flue gas duct section 40c. At this time, the PA included in the flue gas G freely falls so as to be stored in the first hopper 61.

When the flue gas G flows from the first vertical flue gas duct section 40b into the second horizontal flue gas duct section 40c, kinetic energy is applied to the PA from the flue gas, and the PA1 falls on the lower wall surface section (inclination surface) 71 or the hopper 61 side at a predetermined speed due to an inertial force (centrifugal force). In this case, the PA which falls downward collides with the low-repulsion section 62, a repulsion force of the PA1 decreases, and the PA rolls on the inclination surface of the low-repulsion section 62 so as to be collected in the first hopper 61.

In addition, the PA which collides with the lower end portion of the low-repulsion section 62 collides with the low-repulsion section 62, and the repulsion force of the PA decreases. However, there is a concern that the PA may jump over the first hopper 61. However, since the popcorn-ash-trapping section 63 is provided at the inlet portion of the second horizontal flue gas duct section 40c, the PA which collides with the low-repulsion section 62 and jumps over the first hopper 61 collides with the popcorn-ash-trapping section 63. Accordingly, the PA is trapped by the popcorn-ash-trapping section 63 or falls so as to be collected in the first hopper 61.

In this way, in the exhaust duct of the first embodiment, the flue gas duct 60 through which the flue gas flows, the first hopper 61 which is provided in the flue gas duct 60 and in which the PA in the flue gas is collected, the low-repulsion section 62 which is provided on the upstream side of the first hopper 61 in the direction of flow of the flue gas and has a lower coefficient of repulsion than that of the inner wall surface of the flue gas duct 60, and the popcorn-ash-trapping section 63 which is provided on the downstream sides of the first hopper 61 and the low-repulsion section 62 in the direction of flow of the flue gas and traps the PA in the flue gas are provided.

Accordingly, when the flue gas G flows through the flue gas duct 60, the PA is separated from the flue gas G and collected in the first hopper 61. In this case, since the PA has the inertial force, the PA collides with the inner wall surface of the flue gas duct 60, is not collected in the first hopper 61, and easily flows to the downstream side. However, since the PA collides with the low-repulsion section 62, the repulsion amount of the PA decrease and the PA is appropriately collected in the first hopper 61. In addition, the PA which is not collected in the first hopper 61 and flows to the downstream side is trapped by the popcorn-ash-trapping section 63. As a result, it is possible to appropriately trap the PA in the flue gas G in the first hopper 61 and it is possible to improve trapping efficiency.

In the exhaust duct of the first embodiment, the flue gas duct 60 includes the first vertical flue gas duct section 40b through which the flue gas G flows downward in a vertical direction and the second horizontal flue gas duct section 40c which connected to the first vertical flue gas duct section 40b, the first hopper 61 is provided below the connection section between the first vertical flue gas duct section 40b and the second horizontal flue gas duct section 40c, and the low-repulsion section 62 is provided on the lower wall surface section 71 in the first vertical flue gas duct section 40b on the upstream side of the first hopper 61 in the direction of flow of the flue gas. Accordingly, if the low-repulsion section 62 is provided on the upstream side of the first hopper 61, the PA included in the flue gas G collides with the low-repulsion section 62 before the first hopper 61, the inertial force of the PA decreases, and the PA easily enters the first hopper 61. Accordingly, it is possible to decreases the amount of the PA which jumps over the first hopper 61 and is scattered toward the downstream side to flow out.

In the exhaust duct of the first embodiment, the low-repulsion section 62 includes the inclination surface which is inclined in the same direction as that of the first inclination surface 73 of the first hopper 61. Accordingly, if the PA included in the flue gas G collides with the low-repulsion section 62, the PA fails along the first inclination surface 73 of the first hopper 61 from the inclination surface of the low-repulsion section 62 so as to be collected in the first hopper 61, and it is possible to appropriately introduce the PA to the first hopper 61.

In the exhaust duct of the first embodiment, the popcorn-ash-trapping section 63 is provided on the lower wall surface section 72 in the second horizontal flue gas duct section 40c in the vertical direction. Accordingly, since the PA which is not collected in the first hopper 61 and flows to the downstream side collides with the popcorn-ash-trapping section 63, it is possible to appropriately trap the PA.

In the exhaust duct of the first embodiment, the popcorn-ash-trapping section 63 is provided at the height H1 of the region of 30% to 50% of the entire height H from the lower wall surface section 72 in the first horizontal flue gas duct section 40c. When the flue Gas G flows from the first vertical flue gas duct section 40b into the second horizontal flue gas duct section 40c, the PA does not nearly flow to the upstream side of the second horizontal flue gas duct section 40c by the inertial force. Accordingly, since the popcorn-ash-trapping section 63 is provided in only the region to which the PA which is not collected in the first hopper 61 easily flow out, it is possible to reduce the size and the cost of the popcorn-ash-trapping section 63. In addition, since the popcorn-ash-trapping section 63 is provided on only a portion of the second horizontal flue gas duct section 40c, even when the PA is attached to the popcorn-ash-trapping section 63 and the popcorn-ash-trapping section 63 is blocked. It is possible to decrease occurrence of erosion, and it is possible to prevent an increase in a pressure loss.

Moreover, in the boiler of the first embodiment, the furnace 11 which has a hollow shape and is installed along the vertical direction, a combustion equipment 12 which blows the fuel gas toward the inner portion of the furnace 11 and combusts the fuel gas, the exhaust duct which is connected to a downstream side in the direction of the flow of the flue gas in the furnace 11, and the heat collection section (superheaters 41 and 42, reheaters 43 and 44, and economizers 45, 46, and 47) which is provided in the exhaust duct and can collect heat in the flue gas are provided.

Accordingly, flames are formed by blowing the fuel gas into the furnace 11 with the combustion equipment 12, the generated combustion gas flows into the exhaust duct, and the PA is separated from the flue gas G so as to be collected in the first hopper 61 while the heat in the flue gas is collected by the heat collection section. In this case, since the PA collides with the low-repulsion section 62, repulsion amount of the PA decreases and the PA is appropriately collected in the first hopper 61. In addition, the solid particles which are not collected in the first hopper 61 and flow to the downstream side are trapped by the popcorn-ash-trapping section 63. As a result, it is possible to appropriately trap the PA in the flue gas G in the first hopper 61 and it is possible to improve trapping efficiency.

Second Embodiment

Figure 7:
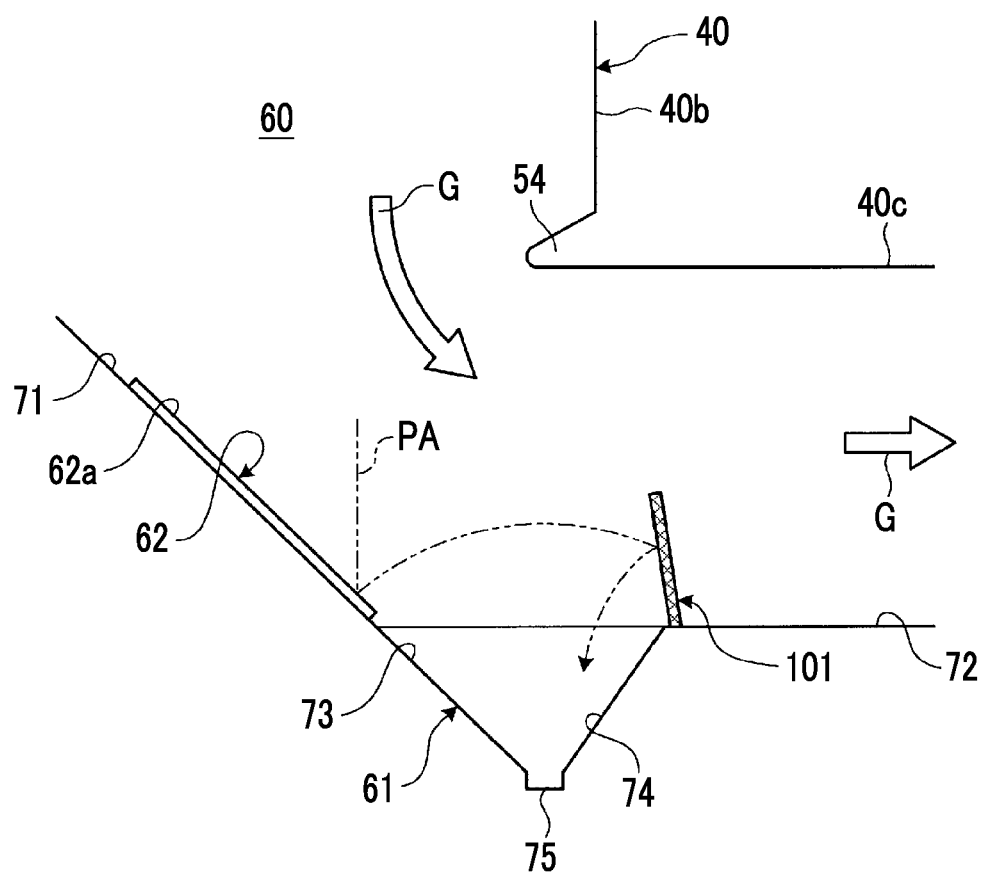
FIG. 7 is a side view showing an exhaust duct of a second embodiment.

FIG. 7 is a side view showing an exhaust duct of a second embodiment. In addition, the same reference numerals are assigned to the members having the same functions as those of the above-described embodiment, and detail descriptions thereof are omitted.

As shown in FIG. 7, the exhaust duct of the second embodiment includes the flue gas duct 60 through which the flue gas flows, the first hopper 61 which is provided in the flue gas duct 60 and in which solid particles in the flue gas are collected, the low-repulsion section 62 which is provided on the upstream side of the first hopper 61 in the direction of flow of the flue gas and has a lower coefficient of repulsion than that of the inner wall surface of the flue gas duct 60, and a popcorn-ash-trapping section (solid particle trapping section) 101 which is provided on the downstream sides of the first hopper 61 and the low-repulsion section 62 in the direction of flow of the flue gas and traps popcorn ashes in the flue gas.

The first hopper 61 mainly collects and stores the PA which is ashes having large diameters included in the flue gas. The first hopper 61 includes the first inclination surface 73 and the second inclination surface 74 which face each other in the flow direction of the flue gas such that an area of the first hopper 61 decreases downward, and the storage section 75 is provided on a bottom position at which the lower end portions of the inclination surfaces 73 and 74 are connected to each other. The low-repulsion section 62 is provided on the lower wall surface section 71 in the first vertical flue gas duct section 40b on the upstream side of the first hopper 61 in the direction of flow of the flue gas. The low-repulsion section 62 has a sheet shape having a predetermined area, is fixed to the lower wall surface section (inclination surface) 71 in the first vertical flue gas duct section 40b, and is configured of a member having a lower coefficient of repulsion than that of the lower wall surface section 71 (for example, steel late) to effectively improve trapping efficiency of the PA in the first hopper 61.

The popcorn-ash-trapping section (solid particle trapping section) 101 traps the PA in the flue gas which cannot be collected by the first hopper 61. The popcorn-ash-trapping section 101 is formed of a wire netting having a mesh shape and is provided so as to be inclined in the vertical direction on the lower wall surface section (horizontal surface) 72. That is, the popcorn-ash-trapping section 101 is provided so as to be inclined by a predetermined angle such that the upper portion of the popcorn-ash-trapping section 101 is positioned on the upstream side (left side in FIG. 7) in the direction of flow of the flue gas G, and the trapping surface of the popcorn-ash-trapping section 101 faces the first hopper 61 side. Moreover, the popcorn-ash-trapping section 101 is provided at the height H1 of the region from 30% to 50% of the entire height H from the lower wall surface section (horizontal surface) to the second horizontal flue gas duct section 40c.

Accordingly, when the flue gas G flows from the first vertical flue gas duct section 40b into the second horizontal flue gas duct section 40c, kinetic energy is applied to the PA from the flue gas, and the PA1 falls on the lower wall surface section (inclination surface) 71 or the first hopper 61 side at a predetermined speed due to an inertial force (centrifugal force). In this case, the PA which falls downward collides with the low-repulsion section 62, the repulsion force of the PA1 decreases, and the PA rolls on the inclination surface of the low-repulsion section 62 so as to be collected in the first hopper 61. In addition, the PA which collides with the lower end portion of the low-repulsion section 62 collides with the low-repulsion section 62, and the repulsion force of the PA decreases. However, the PA is scattered toward the first hopper 61 side. In addition, since the PA which collides with the low-repulsion section 62 and jumps over the first hopper 61 collides with the popcorn-ash-trapping section 101, the PA is trapped by the popcorn-ash-trapping section 101 or falls so as to be collected in the first hopper 61.

In this way, in the exhaust duct of the second embodiment, the low-repulsion section 62 which is provided on the upstream side of the first hopper 61 and the popcorn-ash-trapping section 101 which is provided on the downstream sides of the hopper 61 and the low-repulsion section 62 are provided, and the popcorn-ash-trapping section 101 is provided so as to be inclined such that the upper portion is positioned on the upstream side in the direction of flow of the flue gas.

Accordingly, when the flue gas G flows through the flue gas duct 60, the PA which is not collected in the first hopper 61 and flows to the downstream side is trapped by the popcorn-ash-trapping section 101. In this case, since the popcorn-ash-trapping section 101 is provided so as to be inclined on the upstream side, the popcorn-ash-trapping section 101 causes the PA which is not collected in the first hopper 61 and flows to the downstream side to effectively fall into the first hopper to trap the PA. As a result, it is possible to appropriately trap the PA in the flue gas G in the first hopper 61 and it is possible to improve trapping efficiency.

Third Embodiment

Figure 8:
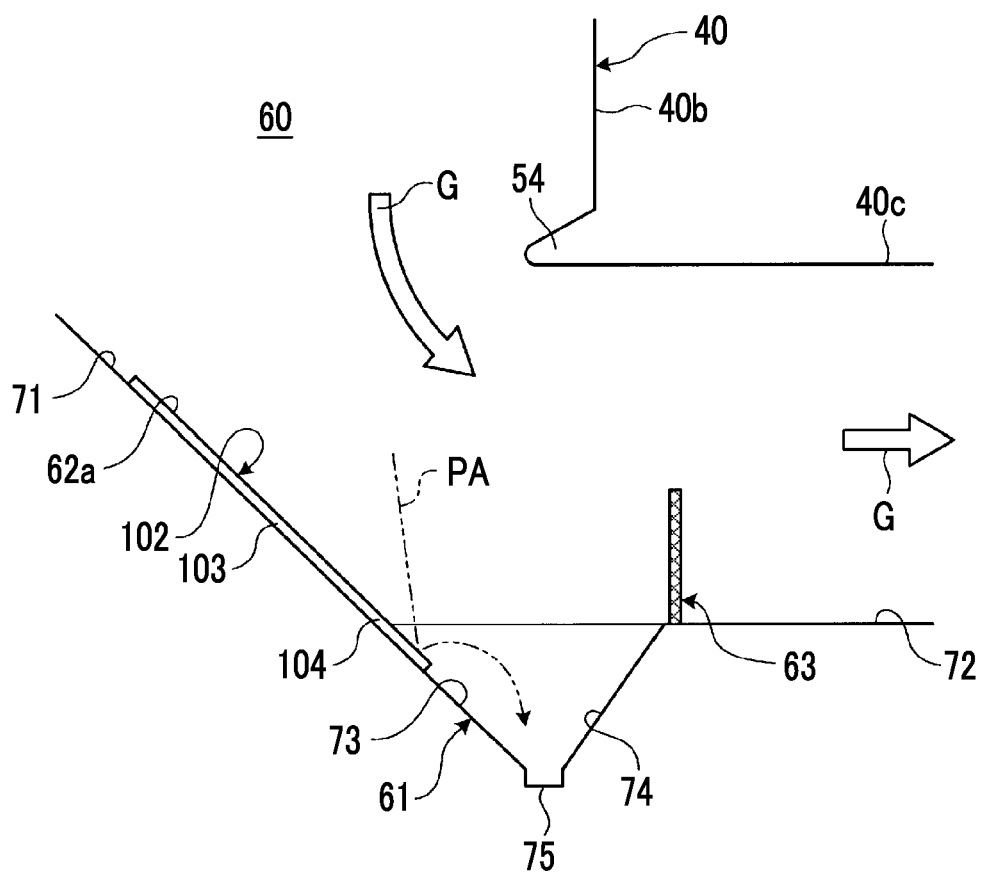
FIG. 8 is a side view showing an exhaust duct of a third embodiment.

FIG. 8 is a side view showing an exhaust duct of a third embodiment. In addition, the same reference numerals are assigned to the members having the same functions as those of the above-described embodiments, and detail descriptions thereof are omitted.

As shown in FIG. 8, the exhaust duct of the third embodiment includes the flue gas duct 60 through which the flue gas flows, the first hopper 61 which is provided in the flue gas duct 60 and in which solid particles in the flue gas are collected, the low-repulsion section 102 which is provided on the upstream side of the first hopper 61 in the direction of flow of the flue gas and has a lower coefficient of repulsion than that of the inner wall surface of the flue gas duct 60, and the popcorn-ash-trapping section 63 which is provided on the downstream sides of the first hopper 61 and the low-repulsion section 102 in the direction of flow of the flue gas and traps popcorn ashes in the flue gas.

The first hopper 61 mainly collects and stores the PA which is ashes having large diameters included in the flue gas. The first hopper 61 includes the first inclination surface 73 and the second inclination surface 74 which face each other in the flow direction of the flue gas such that an area of the first hopper 61 decreases downward, and the storage section 75 is provided on a bottom position at which the lower end portions of the inclination surfaces 73 and 74 are connected to each other. The low-repulsion section 102 is provided from the lower wall surface section 71 to the first inclination surface 73 of the first hopper 61 in the first vertical flue as duct section 40b on the upstream side of the first hopper 61 in the direction of flow of the flue gas. The low-repulsion section 102 has a sheet shape having a predetermined area, and is configured of a first low-repulsion section 103 which is fixed to the lower wall surface section (inclination surface) 71 in the first vertical flue gas duct section 40b, and a second low-repulsion section 104 which is fixed to the first inclination surface 73 of the first hopper 61. The low-repulsion section 102 is configured of a member having a lower coefficient of repulsion than that of the lower wall surface section 71 (for example, steel plate) to effectively improve trapping efficiency of the PA in the first hopper 61.

The popcorn-ash-trapping section 63 traps the PA in the flue gas which cannot be collected by the first hopper 61. The popcorn-ash-trapping section 63 is formed of a wire netting having a mesh shape and is provided in the vertical direction on the lower wall surface section (horizontal surface) 72. Moreover, the popcorn-ash-trapping section 63 is provided at the height H1 of the region from 30% to 50% of the entire height H from the lower wall surface section (horizontal surface) to the second horizontal flue gas duct section 40c.

Accordingly, when the flue gas G flows from the first vertical flue gas duct section 40b into the second horizontal flue gas duct section 40c, kinetic energy is applied to the PA from the flue gas, and the PA1 falls on the lower wall surface section (inclination surface) 71 or the first hopper 61 side at a predetermined speed due to an inertial force (centrifugal force). In this case, the PA which falls downward collides with the low-repulsion section 102, the repulsion force of the PA1 decreases, and the PA rolls on the inclination surface of the low-repulsion section 102 so as to be collected in the first hopper 61. In this case, since the low-repulsion section 102 extends from the lower wall surface section (inclination surface) 71 to the first hopper 61, the repulsion force of the PA which directly falls into the first hopper 61 is decreased by the second low-repulsion section 104, and it is possible to prevent the PA from being scattered from the first hopper 61 again. In addition, the PA which collides with the lower end portion of the low-repulsion section 102 collides with the low-repulsion section 102, and the repulsion force of the PA decreases. However, the PA is scattered toward the first hopper 61 side. Moreover, since the PA which collides with the low-repulsion section 102 and lumps over the first hopper 61 collides with the popcorn-ash-trapping section 63, the PA is trapped by the popcorn-ash-trapping section 63 or falls so as to be collected in the first hopper 61.

In this way, in the exhaust duct of the third embodiment, the low-repulsion section 102 which is provided on the upstream side of the first hopper 61 and the popcorn-ash-trapping section 63 which is provided on the downstream sides of the first hopper 61 and the low repulsion section 102 are provided, and the inclination surface of the low-repulsion section 102 extends to the first inclination surface 73 of the first hopper 61.

Accordingly, when the flue gas G flows through the flue gas duct 60, the PA is separated from the flue gas G and collected in the first hopper 61. In this case, since the PA has an inertial force, the PA collides with the inner wall surface of the flue gas duct 60, is not collected in the first hopper 61, and easily flows to the downstream side. However, since the PA collides with the first low-repulsion section 103, the repulsion amount of the PA decrease and the PA is appropriately collected in the first hopper 61. In addition, the repulsion force of the PA which directly falls into the first hopper 61 is decreased by the second low-repulsion section 104, and it is possible to prevent the PA from being scattered from the first hopper 61 again. In addition, the PA which is not collected in the first hopper 61 and flows to the downstream side is trapped by the popcorn-ash-trapping section 63. As a result, it is possible to appropriately trap the PA in the flue gas G in the first hopper 61 and it is possible to improve trapping efficiency.

Fourth Embodiment

Figure 9:
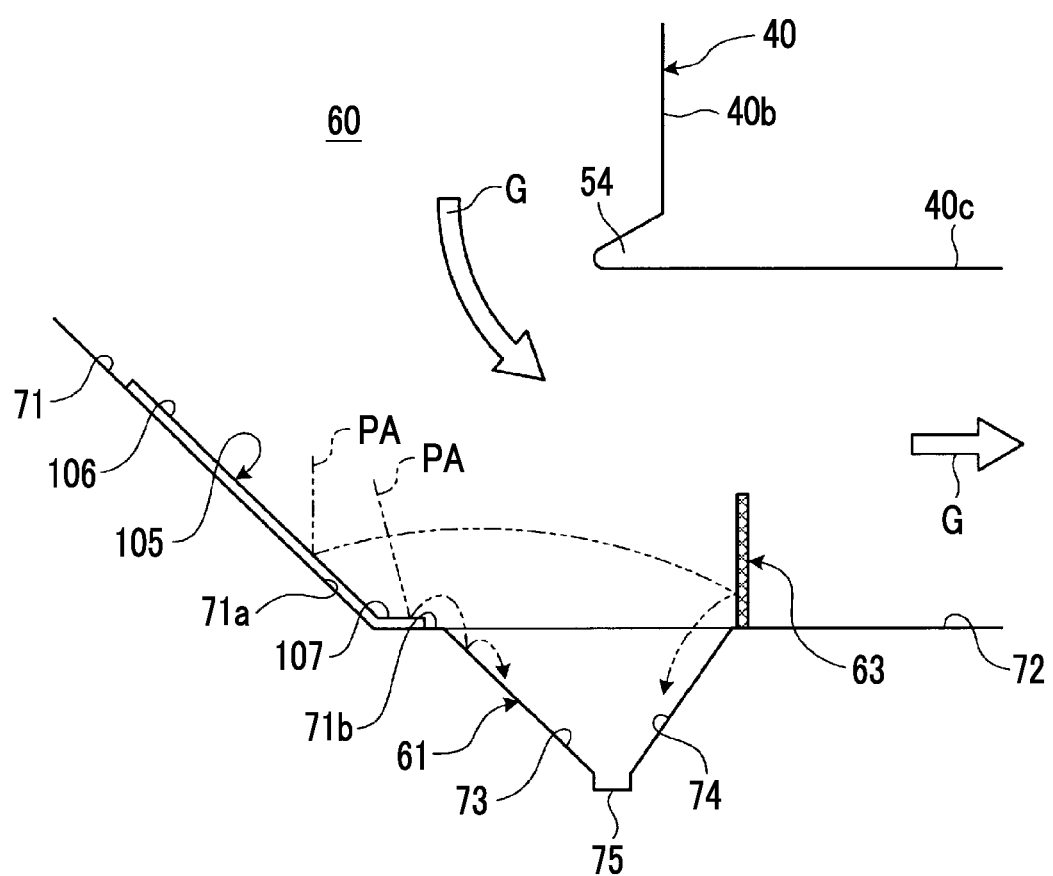
FIG. 9 is a side view showing an exhaust duct of a fourth embodiment.

FIG. 9 is a side view showing an exhaust duct of a fourth embodiment. In addition, the same reference numerals are assigned to the members having the same functions as those of the above-described embodiments, and detail descriptions thereof are omitted.

As shown in FIG. 9, the exhaust duct of the fourth embodiment includes the flue gas duct 60 through which the flue gas flows, the first hopper 61 which is provided in the flue gas duct 60 and in which solid particles in the flue gas are collected, a low-repulsion section 105 which is provided on the upstream side of the first hopper 61 in the direction of flow of the flue gas and has a lower coefficient of repulsion than that of the inner wall surface of the flue gas duct 60, and a popcorn-ash-trapping section 63 which is provided on the downstream sides of the first hopper 61 and the low-repulsion section 105 in the direction of flow of the flue gas and traps popcorn ashes in the flue gas.

The flue gas duct 60 includes the vertical first flue gas duct section 40$b$ through which the flue gas flows downward in the vertical direction and the horizontal second flue gas duct section 40$c$ which is connected to the vertical first flue gas duct section 40$b$, and the first hopper 61 is provided below the connection section of the first vertical flue gas duct section 40$b$ and the second horizontal flue gas duct section 40$c$. The lower wall surface section 71 is provided below the vertical first flue gas duct section 40$b$, and the lower wall surface section 71 is an inclination surface 71$a$ which is inclined downward at a predetermined angle toward the first hopper 61 side and a horizontal surface 71$b$ which is provided between the inclination surface 71$a$ and the first hopper 61.

The first hopper 61 mainly collects and stores the PA which is ashes having large diameters included in the flue gas. The first hopper 61 includes a first inclination surface 73 and a second inclination surface 74 which face each other in the flow direction of the flue gas such that an area of the first hopper 61 decreases downward, and the storage section 75 is provided on a bottom position at which the lower end portions of the inclination surfaces 73 and 74 are connected to each other. The low-repulsion section 105 is provided on the lower wall surface section 71 in the first vertical flue gas duct section 40$b$ on the upstream side of the first hopper 61 in the direction of flow of the flue gas. The low-repulsion section 105 has a sheet shape having a predetermined area and is configured of a first low-repulsion section 106 which is fixed to the inclination surface 71$a$ in the lower wall surface section 71 and a second low-repulsion section 107 which is fixed to the horizontal surface 71$b$ in the lower wall surface section 71. The low-repulsion section 105 is configured of a member having a lower coefficient of repulsion than that of the lower wall surface section 71 (for example, steel plate) to effectively improve trapping efficiency of the PA in the first hopper 61.

The popcorn-ash-trapping section 63 traps the PA in the flue gas which cannot be collected by the first hopper 61. The popcorn-ash-trapping section 63 is formed of a wire netting having a mesh shape and is provided so as to be inclined in the vertical direction on the lower wall surface section (horizontal surface) 72. Moreover, the popcorn-ash-trapping section 63 is provided at the height H1 of the region from 30% to 50% of the entire height H from the lower wall surface section (horizontal surface) to the second horizontal flue gas duct section 40$c$.

Accordingly, when the flue gas G flows from the first vertical flue gas duct section 40$b$ into the second horizontal flue gas duct section 40$c$, kinetic energy is applied to the PA from the flue gas, and the PA1 falls on the lower wall surface section (inclination surface) 71 at predetermined speed due to an inertial force (centrifugal force). In this case, the PA which falls downward collides with the low-repulsion section 105, the repulsion force of the PA1 decreases, and the PA rolls on the low-repulsion section 105 so as to be collected in the first hopper 61. In this case, since the low-repulsion section 105 includes the first low-repulsion section 106 which becomes the inclination surface and the second low-repulsion section 107 which becomes the horizontal surface, the repulsion force of the PA, which falls on the first low-repulsion section 106 decreases, rolls on the first low-repulsion section 106 so as to be collected in the first hopper 61. In addition, the repulsion force of the PA which falls on the second low-repulsion section 107 decreases and the PA does not jump over the first hopper 61 and is collected in the first hopper 61. Moreover, the PA which collides with the lower end portion of the low-repulsion section 105 collides with the low-repulsion section 105, and the repulsion force of the PA decreases. However, a portion of the PA is scattered toward the first hopper 61 side. In addition, since the PA which collides with the low-repulsion section 105 and jumps over the first hopper 61 collides with the popcorn-ash-trapping section 63, the PA is trapped by the popcorn-ash-trapping section 63 or falls so as to be collected in the first hopper 61.

In this way, in the exhaust duct of the fourth embodiment, the low-repulsion section 105 which is provided on the upstream side of the first hopper 61 and the popcorn-ash-trapping section 63 which is provided on the downstream sides of the first hopper 61 and the low-repulsion section 105 are provided, and the low-repulsion section 105 extends from the inclination surface 71a of the lower wall surface section 71 to the horizontal surface 71b.

Accordingly, when the flue gas G flows through the flue gas duct 60, the PA is separated from the flue gas P and collected in the first hopper 61. In this case, since the PA has the inertial force, the PA collides with the inner wall surface of the flue gas duct 60, is not collected in the first hopper 61, and easily flows to the downstream side. However, since the PA collides with the inclined first low-repulsion section 106, the repulsion amount of the PA decrease and the PA appropriately rolls so as to be collected in the first hopper 61. That is, since the low-repulsion section 105 is provided from the inclination surface 71a of the lower wall surface section to the horizontal surface 71b, the low-repulsion section 105 is formed to extend in the direction of flow of the flue gas and the horizontal second low-repulsion section 107 by which the inertial force of the PA can be decreased is formed. Therefore, the PA easily enters the first hopper 61 and it is possible to prevent the PA from being scattered from the first hopper 61 again. As a result, it is possible to appropriately trap the PA in the flue gas G in the first hopper 61 and it is possible to improve trapping efficiency.

Fifth Embodiment

Figure 10:
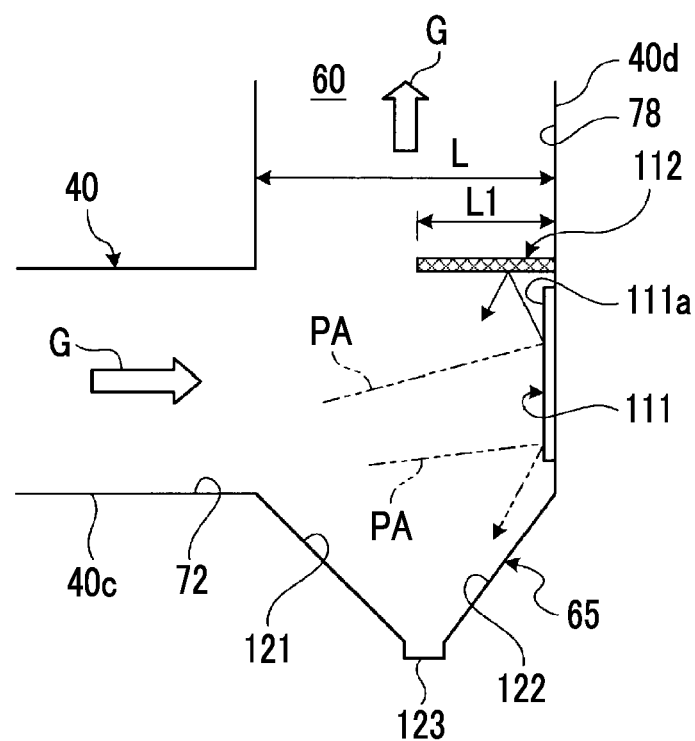
FIG. 10 is a side view showing an exhaust duct of a fifth embodiment.

FIG. 10 is a side view showing an exhaust duct of a fifth embodiment. In addition, the same reference numerals are assigned to the members having the same functions as those of the above-described embodiments, and detail descriptions thereof are omitted.

As shown in FIG. 10, the exhaust duct of the fifth embodiment includes the flue gas duct 60 through which the flue gas flows, a second hopper 65 which is provided in the flue gas duct 60 and in which solid particles in the flue gas are collected, a low-repulsion section 111 which is provided on the upstream side of the second hopper 65 in the direction of flow of the flue gas and has a lower coefficient or repulsion than that of the inner wall surface of the flue gas duct 60, and a popcorn-ash-trapping section (solid particle trapping section) 112 which is provided on the downstream sides of the second hopper 65 and the low-repulsion section 111 in the direction of flow of the flue gas and traps popcorn ashes in the flue gas.

The flue gas duct 60 includes the second horizontal flue gas duct section 40c through which the flue gas flows in the horizontal direction and the second vertical flue gas duct section 40d which is connected to the second horizontal flue gas duct section 40b and through which the flue gas flows upward in the vertical direction, and the second hopper 65 is provided below the connection section of the second horizontal flue gas duct section 40c and the second vertical flue gas duct section 40d. The lower wall surface section 72 is provided below the second horizontal flue gas duct section 40c, and the lower wall surface section 72 becomes a horizontal surface in the horizontal direction. In the second vertical flue gas duct section 40d, a standing wall surface section 78 is provided at a position orthogonal to the lower wall surface section 72 on the downstream side (upper side in the vertical direction in FIG. 10) of the second hopper 65 in the direction of flow of the flue gas, and the standing wall surface section 78 become the vertical surface.

The second hopper 65 mainly collects and stores the PA which is ashes having large diameters included in the flue gas. The second hopper 65 includes a first inclination surface 121 and a second inclination surface 122 which face each other in the flow direction of the flue gas such that an area of the second hopper 65 decreases downward, and a storage section 123 is provided on a bottom position at which the lower end portions of the inclination surfaces 121 and 122 are connected to each other. In addition, in the second hopper 65, an opening portion which can be opened and closed by an on-off valve (not shown) is provided in the storage section 123, and the stored PA can be discharged downward by opening the opening portion. Here, the lower wall surface section 72 of the second horizontal-vertical flue gas duct section 40c and the first inclination surface 121 of the second hopper 65 are connected to each other, and the standing wall surface section 78 of the second vertical flue gas duct section 40d and the second inclination surface. 122 of the second hopper 65 are connected to each other.

The low-repulsion section 111 is provided on the standing wall surface section 78 in the second vertical flue gas duct section 40d on the downstream side of the second hopper 65 in the direction of flow of the flue gas. Since the standing wall surface section 78 of the second vertical flue gas duct section 40d is the vertical surface, the surface of the low-repulsion section 111 becomes vertical surface 111a. The low-repulsion section 111 has a sheet shape having a predetermined area and is configured of a member having a lower coefficient of repulsion than that of the standing wall surface section (for example, steel plate) to effectively improve trapping efficiency of the PA in the second hopper 65. Accordingly, when the PA collides with the low-repulsion section 111, the repulsion amount of the PA decreases. As a result, since the PA which moves along the flue gas P flowing in the horizontal direction directly collides with the low-repulsion section 111, the repulsion amount is smaller than the repulsion amount when the PA directly collides with the standing wall surface section 78 which is a steel plate, and the trapping efficiency of the PA in the second hopper 65 is improved.

The popcorn-ash-trapping section 112 traps the PA in the flue gas which collides with the low-repulsion section 111. The second vertical flue gas duct section 40d has a rectangular cross section and includes the standing wall surface section 78, and the popcorn-ash-trapping section 112 is provided on the standing wall surface section 78 in the horizontal direction. In addition, the popcorn-ash-trapping section 112 is provided on a length L1 of region from 30% to 50% of the entire length L from the standing wall surface section 78. That is, the second horizontal flue gas duct section 40c and the second vertical flue gas duct section 40d are connected to each other so as to be bent 90°, the upstream end portion of the second vertical flue gas duct section 40d, that is, the outer peripheral side of the region immediately before the second hopper 65 is blocked by the popcorn-ash-trapping section 112.

Accordingly, when the flue gas G flows from the first horizontal flue gas duct section 40c into the second vertical flue gas duct section 40d, kinetic energy is applied to the PA from the flue gas, and the PA1 moves toward the standing wall surface section 78 side at a predetermined speed due to an inertial force (centrifugal force). In this case, the PA collides with the low-repulsion section 111, the repulsion force of the PA1 decreases, and the PA falls into the second hopper 65 so as to be collected after the PA collides with the low-repulsion section 111.

In addition, the PA which collides with the upper end portion of the low-repulsion section 111 collides with the low-repulsion section 111 and the repulsion force of the PA decreases. However, there is a concern that the PA may be scattered upward. With respect to this, since the popcorn-ash-trapping section 112 is provided at the inlet portion of the second vertical flue gas duct section 40d, the PA which collides with the low-repulsion section 111 and is scattered collides with the popcorn-ash-trapping section 112. Accordingly, the PA is trapped by the popcorn-ash-trapping section 112 or falls so as to be collected in the second hopper 65.

In this way, in the exhaust duct of the fifth embodiment, the flue gas duct 60 through which the flue gas flows, the second hopper 65 which is provided in the flue gas duct 60 and in which the PA in the flue gas is collected, the low-repulsion section 111 which is provided on the downstream side of the second hopper 65 in the direction of flow of the flue gas and has lower coefficient of repulsion than that of the inner wall surface of the flue gas duct 60, and the popcorn-ash-trapping section 112 which is provided on the downstream sides of the second hopper 65 and the low-repulsion section 111 in the direction of flow of the flue gas and traps the PA in the flue gas are provided.

Accordingly, when the flue gas G flows through the flue gas duct 60, the PA is separated from the flue gas G and collected in the second hopper 65. In this case, since the PA has an inertial force, the PA collides with the inner wall surface of the flue gas duct 60, is not collected in the second hopper 65, and is easily scattered to the surrounding. However, since the PA collides with the low-repulsion section 111, the repulsion amount of the PA decrease and the PA is appropriately collected in the second hopper 65. In addition, a portion of the PA which collides with the low-repulsion section 111 and is scattered to the surrounding is trapped by the popcorn-ash-trapping section 112. As a result, it is possible to appropriately trap the PA in the flue gas G in the second hopper 65 and it is possible to improve trapping efficiency.

Moreover, in the above-described embodiments, the popcorn-ash-trapping sections 63, 101, and 112 are provided in the region from 30% to 50% of the height H or the length L of the flue gas duct 60. However, the popcorn-ash-trapping sections 63, 101, and 112 may be provided in a region of 100% of the height H or the length L of the flue gas duct 60. In this case, it is possible to reliably trap the PA which is not collected in the hoppers 61 and 65 and flows toward the downstream side by the popcorn-ash-trapping section.

In addition, in the above-described embodiments, the case where the exhaust duct of the present invention is applied to the pulverized coal fired boiler is described. However, the present invention is not limited this type of boiler. In addition, the present invention is not limited to the boiler, and the present invention may be applied to any exhaust duct as long as the flue gas including the solid particles can flow to it.

REFERENCE SIGNS LIST

10: pulverized coal fired boiler
11: furnace
21, 22, 23, 24, 25: combustion burner
40: flue
40b: first vertical flue gas duct section (first vertical section)
40c: second horizontal flue gas duct section (horizontal section)
40d: second vertical flue gas duct section
41, 42: superheater (heat collection section)
43, 44: reheater (heat collection section)
45, 46, 47: economizer (heat collection section)
60: flue gas duct
61: first hopper
62, 102, 105, 111: low-repulsion section
63, 101, 112: popcorn-ash-trapping section
65: second hopper
71, 72: lower wall surface section
78: standing wall surface section
G: flue gas
PA: popcorn ash (solid particle)

The invention claimed is:

1. An exhaust duct, comprising:
a flue gas duct through which a flue gas flows, the flue gas duct having a vertical section through which the flue gas flows downward in a vertical direction and a horizontal section connected to the vertical section;
a hopper which in the flue gas duct and configured to collect solid particles in the flue gas, the hopper being located below a connection section between the vertical section and the horizontal section of the flue gas duct;
a low-repulsion section on an upstream side of the hopper in a direction of flow of the flue gas, and on a lower wall surface section of the vertical section, and the low-repulsion section having a lower coefficient of repulsion than that of an inner wall surface of the flue gas duct; and
a solid particle trapping section on the inner wall surface of the flue gas duct on a downstream side of both the hopper and the low-repulsion section in the direction of flow of the flue gas, and the solid particle trapping section being configured to trap solid particles in the flue gas;
wherein the lower wall surface section of the vertical section includes an inclination surface and a horizontal surface arranged in the direction of the flue gas flow, and the low-repulsion section extends from the inclination surface to the horizontal surface so as to cover at least a portion of the inclination surface and the horizontal surface.

2. The exhaust duct according to claim 1, wherein the low-repulsion section includes an inclination surface inclined in the same direction as an inclination surface of the hopper.

3. The exhaust duct according to claim 2, wherein the inclination surface of the low-repulsion section extends to the inclination surface of the hopper.

4. The exhaust duct according to claim 1, wherein the solid particle trapping section is oriented to extend in the vertical direction.

5. The exhaust duct according to claim 1, wherein the solid particle trapping section is inclined such that an upper portion of the solid particle trapping section is positioned on the upstream side of the hopper in the direction of flow of the flue gas.

6. The exhaust duct according to claim 1, wherein the solid particle trapping section is provided in a region of 30% to 50% of the entire height of the flue gas duct from the lower wall surface section in the horizontal section.

7. The exhaust duct according to claim 1, wherein the solid particle trapping section is provided in a region of 100% of an entire height of the flue gas duct.

8. The exhaust duct according to claim 1, wherein the vertical section is a first vertical section, the hopper is a first hopper, the connection section is a first connection section, and the low-repulsion section is a first low-repulsion section, the flue gas duct further having a second vertical section connected to the horizontal section and through which the flue gas flows upward in a vertical direction, the exhaust duct further comprising:
a second hopper below a second connection section between the horizontal section and the second vertical section, and a second low-repulsion section on a standing wall surface section in the second vertical section facing the horizontal section on the downstream side of the second hopper in the direction of flow of the flue gas.

9. The exhaust duct according to claim 8, wherein the solid particle trapping section is a first solid particle trapping section, further comprising a second solid particle trapping section on the inner wall surface of the flue gas duct on a downstream side of both the second hopper and the second low-repulsion section in the direction of flow of the flue gas, the second solid particle trapping section being configured to trap solid particles in the flue gas, the second solid particle trapping section oriented to extend in the horizontal direction.

10. The exhaust duct according to claim 9, wherein the second solid particle trapping section is provided in a region of 30% to 50% of a horizontal length of the second vertical section from the standing wall surface section in the second vertical section facing the horizontal section.

11. A boiler comprising:
a furnace having a hollow shape and oriented to extend in a vertical direction;
combustion equipment configured to blow a fuel toward an inner portion of the furnace and to combust the fuel;
the exhaust duct according to claim 1 connected to a downstream side in a direction of flow of a flue gas in the furnace; and
a heat collection section in the exhaust duct and configured to collect heat in the flue gas.

* * * * *